United States Patent Office 3,479,880
Patented Nov. 25, 1969

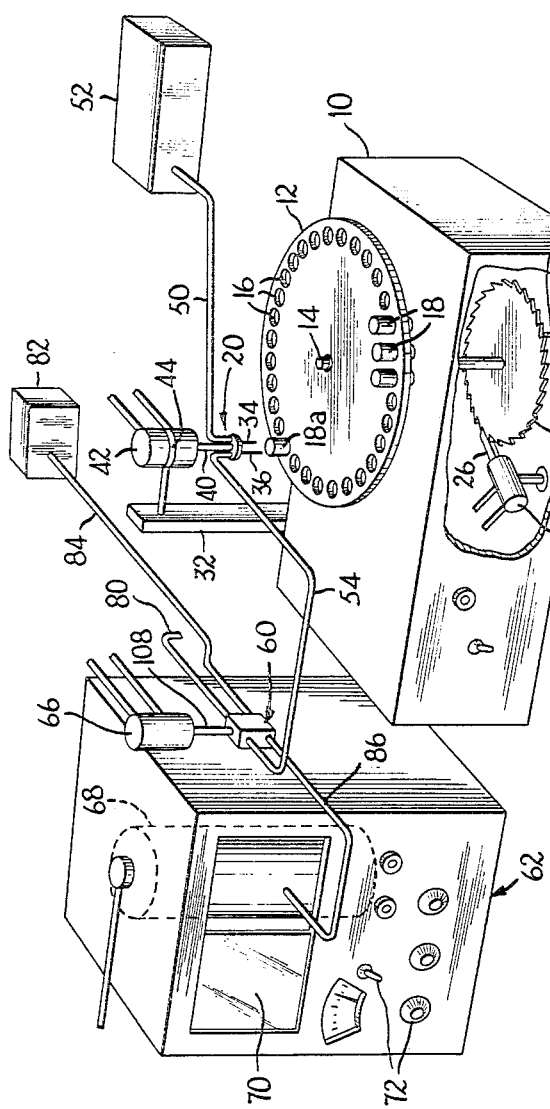

3,479,880
APPARATUS FOR DELIVERING SAMPLES TO A GAS CHROMATOGRAPH
Walter F. Mutter, White Bear Lake, Minn., and Duane C. Watson, Bon Air, Va., assignors to Philip Morris Incorporated, New York, N.Y., a corporation of Virginia
Filed Nov. 3, 1967, Ser. No. 680,461
Int. Cl. G01n 1/00
U.S. Cl. 73—422                    1 Claim

ABSTRACT OF THE DISCLOSURE

Apparatus for delivering liquid samples to a chromatograph in which a probe comprised of a pair of tubular needles is stroked downwardly through the top of a vial containing the liquid to be sampled and held in a sampling position on a turntable with the first of the needles having its tip end located above the sample level and the second needle having its tip end located near the bottom of the vial. A pressurized gas is directed into the vial through the first needle and forces the liquid sample through the second needle, the sample displaced from the vial being directed through a metering valve which functions in a first valving condition during an initial part of the sampling operation to direct liquid sample to a discharge line thereby purging the system of old sample traces. After a suitable period of purging, the metering valve is oriented to a second valving condition and delivers a metered quantity of the liquid sample to a conduit connected with the inlet port of the gas chromatograph column, the metered quantity being swept through the latter by a carrier gas. The metering valve is then returned to its first valving condition, the probe retracted from the vial and the turntable on which the respective sample carrying vials are mounted is indexed to station the succeeding vial in sampling position.

BACKGROUND OF THE INVENTION

The apparatus of the present invention is designed to deliver metered amounts of liquid samples from collection vials in which the samples are stored to the injection port of a gas chromatograph column wherein the samples are analyzed in known manner to determine the chemical constituency thereof.

Apparatus is known in the art for consecutively sampling and carrying out certain routine analyses on large numbers of similar samples automatically. Thus equipment is known for use with gas chromatographic appartus which automatically accepts successive samples in solution, dries off the solvent, and then transfers each residual sample in its carrier to a heated chamber from whence it is swept by a carrier gas to a gas chromatographic column for analysis. This arrangement is satisfactory for materials with high boiling points where sample volatilization during solvent evaporation is negligible. If the components to be analyzed have low volatility or one not very different from that of the solvent, a portion of the sample generally is lost during solvent drying and the analytical values of the sample obtained are usually inaccurate as to the true chemical nature of the sample constituents. Transferring the sample container directly to the heated chamber without first drying the solvent would not overcome or lessen this problem because of the likelihood of flashing part of the sample and solvent within the chamber with consequent escape thereof through the chamber access opening before the latter can be closed.

The present invention, on the other hand, provides a delivery system for delivering liquid samples to a gas chromatograph column in successive order from a plurality of vials in which the samples are contained and in a manner involving no loss of any of the components of the samples before the same are analyzed. Furthermore, the apparatus of the present invention makes it possible to deliver the samples without need to use a solvent. Also, metered quantities of exact volume are delivered to the column of the gas chromatograph so that greater uniformity of results is achieved. The unit can be operated fully automatically requiring but minimum service of an operator as when replenishing sample vials, and can be adapted for use with continuous sampling of large numbers of samples.

SUMMARY OF THE INVENTION

The present invention is concerned with apparatus for delivering accurately measured amounts of liquid sample to a gas chromatograph column. The apparatus includes an indexable turntable on which a plurality of vials, each holding a sample to be analyzed are mounted, the most convenient arrangement involving arranging the vials in a circle adjacent the turntable periphery, the turntable being rotated in stepwise movements to successively station the vials in sampling position. A sampling probe comprised of a pair of parallel arranged tubular needles is supported a distance above the turntable for vertical reciprocating movement with one of the needles having its tip end vertically spaced closer to the turntable than the tip end of the other so that the tip end of the first needle will locate above the sample level and the tip end of the second needle will locate below the sample level when the probe is stroked downwardly into a vial stationed in sampling position. A source of a pressurized fluid is connected with the first needle and pressurized fluid thus delivered to the vial acts to displace the sample from the vial through the second needle delivering same to a metering value which during an initial phase of the sampling operation is set in a first operative valving condition to establish flow through a purging line for a predetermined period to permit traces of old sample to be removed from the delivery system. At the end of the predetermined period, the metering valve is oriented to a second operative valving condition in which a slider member forming part of the metering valve carries a measured amount of sample into circuit with a carrier gas that delivers the sample to and through the inlet port of the chromatograph column. Suitable controls are provided for automatically stroking the sample probe, shifting the metering valve slider member positioning and indexing the turntable in timed sequence until all samples carried on the turntable are delivered to the chromatograph column.

The invention accordingly comprises the features of construction, combination of elements and arrangement of parts, which will be exemplified in the construction hereinafter set forth and the scope of the invention will be indicated in the claim.

BRIEF DESCRIPTION OF THE DRAWINGS

A fuller understanding of the nature and objects of the invention will be had from the following detailed description taken in conjunction with the accompanying drawings in which:

FIGURE 1 is a perspective view of a liquid sample delivery apparatus constructed in accordance with the principles of the present invention, portions of the apparatus being cut away to show the constructional details thereof.

FIGURE 2 is a vertical sectional view on enlarged scale of one of the liquid sample vials illustrating the manner in which the needles of the sampling probe enter same.

FIGURE 4 is a longitudinal sectional view of an embodiment of a two condition metering valve which can be used in the apparatus of the present invention, the valve slider member being shown in its first operative or purging position.

FIGURE 4a is the same as FIGURE 4 except it shows the slider member in its second operative or sample delivery position.

Throughout the description like reference numerals are used to denote like parts in the drawings.

DESCRIPTION OF THE PREFERRED EMBODIMENTS

Figure 3:
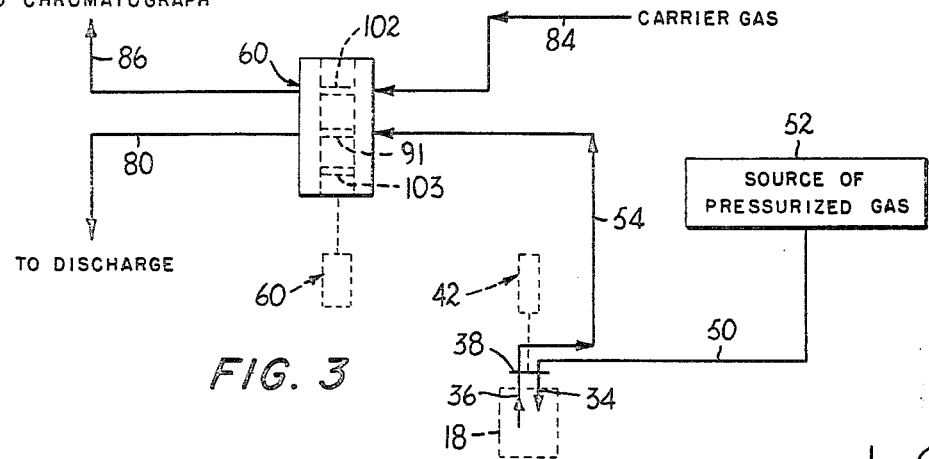
FIGURE 3 is a flow diagram illustrating the flow paths of liquid sample in being delivered to a gas chromatograph with the apparatus of the present invention.

The liquid sample delivery apparatus of the present invention is shown generally in FIGURE 1 and includes a box-like housing 10 at the top of which is supported turntable 12 fixed to shaft 14, the latter being rotatable about a vertical axis, suitable support and bearing means (not shown) being provided in the housing to receive the shaft. The turntable 12 is provided with a series of openings 16 extending spacedly in a circle around the turntable adjacent the periphery thereof, each of the openings 16 serving to receive one of a plurality of liquid sample vials 18. Only several of the vials 18 are shown mounted on the turntable 12 but it will be understood that the apparatus is designed to be used in conjunction with sample testing on a volume basis and hence the turntable will ordinarily contain a large number of sample vials, as for example, forty vials. The vials 18 are as shown in FIGURE 2 of essentially cylindrical shape having a lower section of reduced diameter to facilitate seating the vials in the turntable openings. Each vial has an upper opening as at 17 which is covered with a septum 19 or other suitable seal device. The turntable 12 is adapted to be indexed in stepwise movements for successively stationing each of the vials carried thereon in a sampling position located beneath the sampling probe 20. In FIGURE 1, sampling vial 18a is shown stationed in sampling position. The indexing movements of the turntable 12 can be effected with any suitable indexing means, one convenient means involving providing a sprocket 22 which is fixedly connected with the shaft 14 and a drive device such as an electrically or pneumatically operated cylinder 24, the reciprocally operating plunger 26 of which is adapted to engage the teeth of the sprocket 22 to apply stepwise rotative movements to the latter. At times other than those when the turntable 12 is being indexed between succeeding index positions, an air operated locking cylinder 28 is actuated allowing the plunger 30 thereof to enter between successive sprocket teeth to prevent spurious rotation thereof, suitable controls also being provided to retract plunger 30 during the indexing movements of the turntable.

The sampling probe 20 can be arranged at any suitable location on housing 10, one convenient arrangement being to support it at the rear of the housing by means of an upright standard 32 although it will be understood that the specific location and structure supporting the sampling probe can be varied as long as the essential requirement that the probe 20 be supported a distance above the turntable 12 is fulfilled. The sampling probe as will be best noted in FIGURES 1 and 2, is comprised of a pair of tubular needles 34 and 36 extending parallel with each other and supported as a unit in a disc 38, one of the needles 34 having its tip end vertically displaced with respect to the tip end of the other needle 36, for a reason as will appear. The disc 38 as best seen in FIGURE 2, is fixedly connected to the plunger 40 of another electrically or pneumatically operated cylinder unit 42, the cylinder unit being connected with the upright standard as by means of clamp 44 (FIGURE 1). The cylinder unit 42 functions to reciprocate the sampling probe vertically to extend the probe into a vial stationed in sampling position and to retract the probe from the vial at the end of the sampling operation. Connected with the needle 34 as shown in FIGURES 1 and 2, is a flexible hose or conduit 50 which also is connected with a source of pressurized gas 52. Tubular needle 36 on the other hand, is connected by means of flexible hose or conduit 54 with a metering valve 60 mounted on one side of a gas chromatograph unit 62, the metering valve having a two position slider member 64, the positioning of which is controlled by means of another electrically or pneumatically operated cylinder unit 66.

The gas chromatograph unit 62 which is shown in FIGURE 1, as being located adjacent casing 10, is an analyzer unit of a type and construction known in the art and includes interiorly thereof a column 68 to which is delivered the sample being analyzed. The front of the chromatograph casing is provided with a window 70 and customary controls 72. Further elaboration as to the construction and functioning of the chromatograph is not believed necessary since those skilled in the art will readily understand same. For convenience and to minimize the length of conduit through which the liquid sample must pass enroute to the chromatograph column 68, the metering valve 60 is mounted at one side of the chromatograph housing although it will occur to those skilled in the art that the metering valve also could be supported on casing 10.

The manner in which the delivery of liquid sample from the respective vials 18 to the chromatograph column 68 occurs will be best appreciated by referring to FIGURES 2 and 3. As will be noted therein, when the probe is stroked downwardly, the needles 34, 36 which have sharp tips pierce the vial septum 19 and enter the vial through opening 17 with the tip end of needls 36 locating below the level of the liquid sample 74 and the tip end of needle 34 locating above the sample level at the end of the stroking travel. Pressurized gas from source 52 is then delivered by means of conduit 50 and needle 34 to the inside of vial 18, the gas admitted to the vial functioning to displace the sample 74 through needle 36 and outwardly of the vial by way of conduit 54. The flow of pressurized gas from source 52 can be of a continuous nature or of an intermittent nature and if the latter, suitable automatic valving controls can be included, the delivery of the gas being synchronized with the operation of the sampling probe, etc. It is preferable at the early or initial stages of the sampling operation that the delivery system be purged of any old sample traces as would exist from the delivery operations associated with the sample emptied from the preceding vial. Thus, for each separate sample delivery the metering valve 60 is maintained at the initial or purging stage of the delivery operation in a condition wherein the slider member 64 is in its first operative position. Thus the fresh liquid sample entering the metering valve from conduit 54 passes through the metering valve and exits therefrom by way of conduit 80 which dumps or discharges the sample and in this manner traces of the old sample are washed from the system. During the purging operation carrier gas from a suitable source 82 is directed by means of conduit 84 through the metering valve and from the valve through conduit 86 in a continuously sweeping path through the chromatograph column 68. At the end of predetermined period when the flow of fresh sample through the metering valve is such that only pure sample and no contaminant of old sample trace remains therein, slider member 64 is moved to its second position. In moving to the second position, the slider member carries within a lateral passage 91 formed therein a measured quantity of the liquid sample and upon the slider member reaching its second position, passage 91 is placed in fluid communication with conduits 84 and 86 so that the carriage gas now sweeps the sample from the metering valve and into the chromatograph column. As soon as the metered quantity of sample has been delivered to the chromatograph, the slider member 64 is returned to its first position orienting the valve preparatory to receiving a sample delivery from the succeeding vial during the next cycle of operation.

The construction of the metering valve 60 will now be described in greater detail. A preferred form of metering valve is a slide valve model LSV–220 as manufactured by Loenco Inc. of Altadena, Calif. This valve is designed to have two operative valving conditions depending on the position of the slider member 64 and functions to deliver a measured quantity of a liquid in predetermined manner when the slider member is moved from a first to a second operative position. As seen in FIGURE 4, the valve includes a main or outer body part 90 which is provided with a first pair of aligned slotted passages 92 and 92a and a second pair of aligned slotted passages 94 and 94a. The valve also has an inner body portion or pad 96 which similarly to the outer body is provided with pairs of slotted passages 98, 98a and 100, 100a aligned with each other and with the associated pairs of the passages in the outer body. Slider member 64 is supported centrally in the inner body portion or pad 96 and is slidable between the first operative position shown in FIGURE 4 and the second operative position shown in FIGURE 4a. The slider member, it will be noted, is provided with transversely extending passages 91, 102 and 103 extending side to side of the slider and which when the latter is in first operative position passages 91 and 102 register with or locate in fluid communication with the valve body slotted passages 92a, 98a, 98, 92 and the valve body slotted passages 94a, 100a, 100, 94 respectively. However, when the slider member 64 is moved to its second operative position as shown in FIGURE 4a, the slider member passage 91 is shifted to a condition of alignment or fluid communication with the passages 94a, 100a, 100, 94 of the valve and slider member passage 103 is moved to condition of fluid communication with passages 92a, 98a, and 92, 98 to provide unimpeded flow to pressurized gas through the metering valve and thereby prevent pressure buildup within the vial stationed in sampling position. For convenience of description herein, the outer and inner body passages shown to the right of the slider member in FIGURES 4 and 4a are termed "inlet" passages whereas, those to the left of the slider member 64 are termed "outlet" passages. It will be readily perceived by those skilled in the art that the movement of the slider member from its first to second operative positions will carry a measured or metered quantity of liquid sample into communication with the inlet passages 94, 100 and the outlet passages 94a, 100a, so that a carrier gas sweeping through the metering valve from conduit 84 will carry the measured quantity of liquid sample out of the valve and deliver same to the gas chromatograph column by means of flexible hose or conduit 86. Positioning of the slider member 64 of the metering valve is controlled by operation of the air cylinder unit 66, the rod 108 of the latter being connected with the slider member. Another type of valve which can be used with the apparatus is a liquid injector valve Model 6H as manufactured by Union Carbide Chemical Corp. This valve is essentially of the same construction as metering valve 60 except that it contains suitable means for cooling the valve body in the purge section and for heating the valve body in the inject or delivery section with the two sections being thermally isolated to reduce heat transfer therebetween. This form of valve is advantageous to use in conjunction with the delivery of high boiling point samples so they will be vaporized within the valve and thus more readily delivered to the chromatograph.

Figure 5:
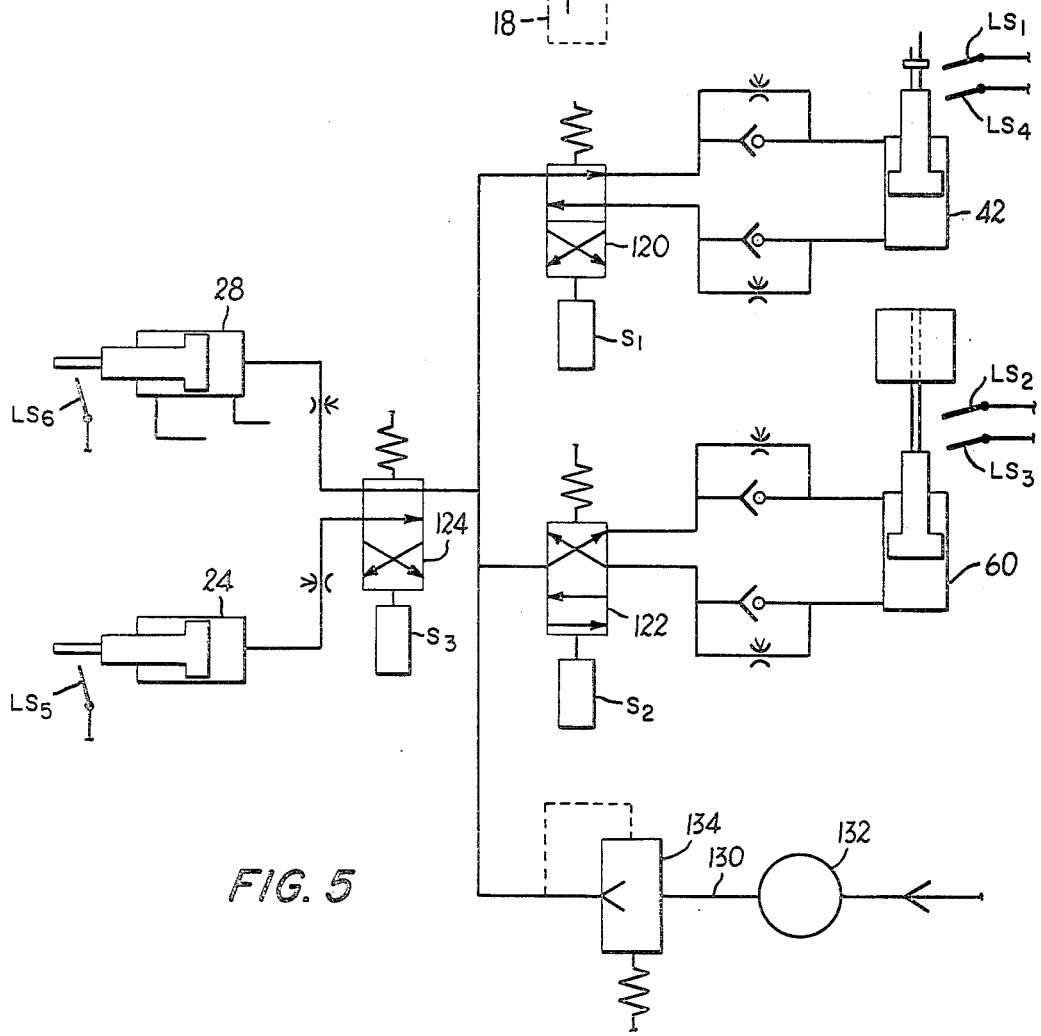
FIGURE 5 is a schematic diagram of the pneumatic devices used for effecting movements of the sampling probe, turntable and metering valve.
Figure 6:
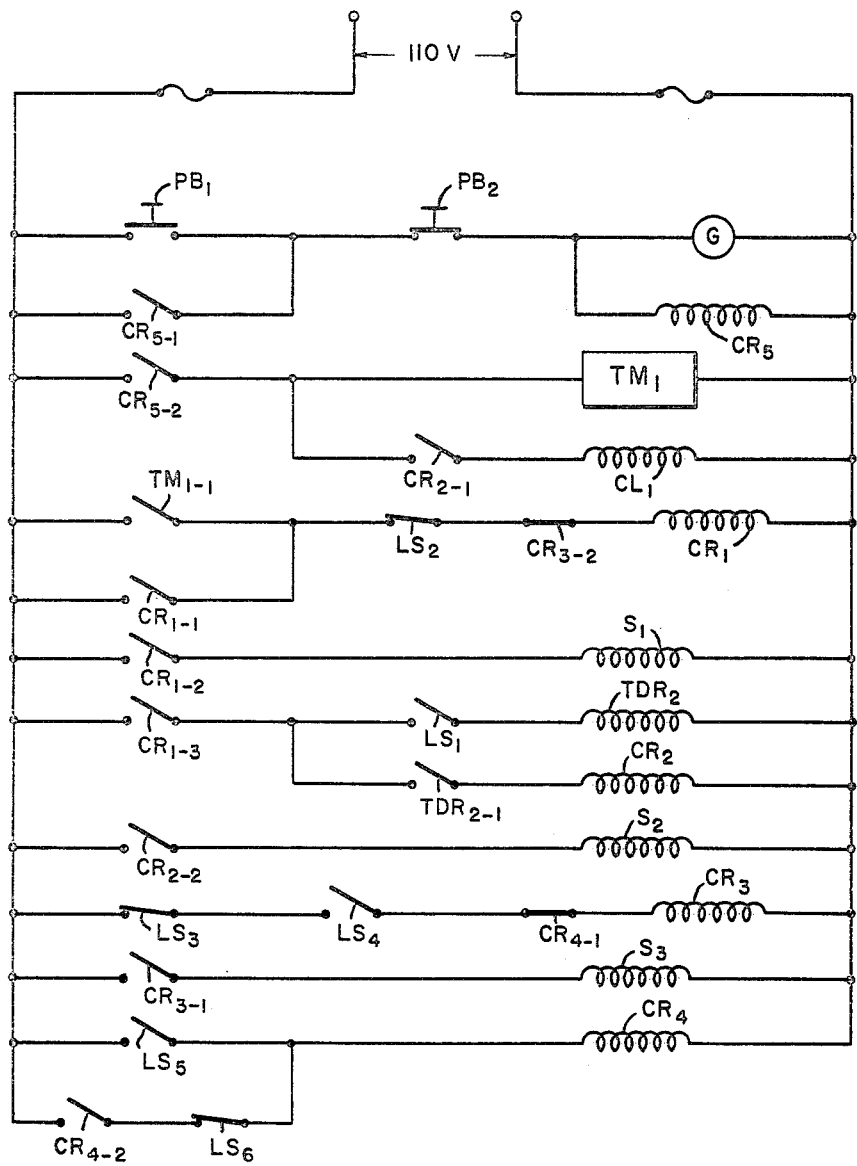
FIGURE 6 is a wiring diagram of the electrical circuitry associated with the apparatus.

As was previously mentioned, the apparatus of the present invention is adapted for use in sampling large numbers of liquid samples automatically with minimum supervision of the apparatus by operating personnel. For example, the contents of 40 vials can be delivered to the chromatograph 62 over a predetermined period of time, for example, four hours without requiring the presence of an operator. The mode and devices with which this control is effected will be described shortly with continuing reference being made to the diagrams of FIGURES 5 and 6. As was previously stated herein, physical movement of the turntable 12, sampling probe 20 and metering valve slider member 64 can be achieved with various types of motive means. In representative form and as shown in FIGURE 5, the motive means employed are air cylinder units, the admission and exhaust of air to these units being controlled by electrical solenoid operated crossover type air valves. It will be apparent however that electrical solenoids also could be used directly as motive means. Thus, the reciprocating movement of the sampling probe 20 is effected by means of air cylinder unit 42, the stroking of the latter being produced by the manner in which air is admitted thereto through crossover type control valve 120, operation of the control valve 120 being controlled by electrical solenoid S1. In the course of the stroking movement of the air cylinder unit 42, it actuates two switch units LS1 and LS4 in the sequence and for the purposes as will appear. Similarly, the slider member 64 of the metering valve is positioned according to the stroking condition of air cylinder unit 60 which has associated with it a crossover type control valve 122 operated by means of electrical solenoid S2. The stroking movement of the air cylinder unit 60 also actuates according to predetermined sequence a pair of switches LS2 and LS3. The indexing of the turntable 12 is provided by air cylinder unit 24 which in turn is controlled with crossover type control valve 124, the operation of which is controlled by solenoid S3. Switch LS6 is associated with the air cylinder unit 24 and functions in the manner as will appear. During the course of the actual sampling operation, locking of the turntable is provided by means of air cylinder unit 28 which is adapted to actuate switch unit LS5 and is controlled by the same control valve 124 which controls air cylinder unit 24. Air under pressure for the operation of the foregoing devices is provided from a suitable source through conduit 130, the circuit including a suitable filter unit 132 and pressure regulator 134.

Turning now to a description of the sampling control cycle, it will be assumed that a sample containing vial is stationed in sampling position with the turntable locking means being engaged to prevent turntable rotation. The cycle of operation is then initiated by manually closing normally open push-buttom switch PB1 which energizes indicator lamp G and control relay CR5. Contacts CR5–1 are thereby closed to provide a holding circuit for the relay CR5 which will remain energized unless the holding circuit is opened by an operator manually actuating normally closed push-button switch PB2. Contacts CR5–2 are also closed thereby energizing timer TM1. When the contacts TM1–1 of the timer close, control relay CR1 is energized through switch LS2 which is held in a closed position whenever the metering valve is in its first valving or purging condition, and the normally closed contacts CR3–2 of control relay CR3. A holding circuit for relay CR1 is established by closure of contacts CR1–1, the holding circuit being in series with switch LS2 and contacts CR3–2. Closure of contacts CR1–2 energizes the solenoid S1 controlling valve 120 positioning same so as to admit air to cylinder unit 42 and thereby cause stroking of the sampling probe downwardly moving the needles 34, 36 into vial 18a stationed in a sampling position. At the end of the downward travel of the probe, limit switch LS1 associated with cylinder unit 42 is closed, energizing time delay relay TDR2 through the now closed contacts CR1–3 of control relay CR1. After a predetermined time delay, the contacts TDR2-1 close, thereby energizing control relay CR2. The closure of contacts CR2-1 resets time clutch unit CL1 through the now closed contacts CR5-2 of relay CR5. Closure of contacts CR2-2 energized solenoid S2 controlling air valve 122 which is positioned so as to admit air to cylinder unit 60, stroking same and shifting the positioning of the slider member 64, from its first to second operative positions, the movement of the latter causing the opening of limit switch LS2. Relay CR1 is thereby de-energized, resulting in the de-energizing of solenoid S1, time delay relay TDR2 and control relay CR2. Upon this last occurence, solenoid S2 is de-energized and returns slowly to its normal purging or first operation position thus repositioning valve 122 so that air cylinder 60 is stroked in an opposite direction returning slider member 64 to its first operative position and closes limit switch LS3. During this period, limit switch LS4, which had been closed upon de-energization of solenoid S1 and raising up of the sampling probe, limit switch LS3, which was closed by de-energization of solenoid S2, and normally closed contacts CR4-1 of control relay CR4 provide an energizing path for control relay CR3. This relay in turn energizes solenoid S3 through contacts CR3-1 and positions air valve 124 to release air from cylinder unit 28 to allow the piston of same to retract and thereby unlock the turntable 12. Concurrent with the latter movement air is admitted to cylinder 24 to stroke same and hence effect movement of turntable 12 to index it one step to station the succeeding vial in sampling position. Stroking of cylinder 24 also effects closure of limit switch LS5, thereby energizing control relay CR4. Contacts CR4-1 of this relay thus open and in turn operate to de-energize control relay CR3, which results in de-energization of solenoid S3. Opening of limit switch LS3 by return movement of the metering valve slider member 64 to its first operative position does not affect relay CR4 since a holding circuit is provided through contacts CR4-2. Upon de-energization of solenoid S3, the positioning of valve 124 changes to admit air to cylinder 28 to stroke same and lock the turntable, and to release air from cylinder 24 to retract its piston. The last mentioned movements of the air cylinders 24 and 28 opens limit switch LS5 thereby interrupting the holding circuit of relay CR4 and de-energizing the relay, limit switch LS6 being closed but having no effect on relay CR4 since relay contacts CR4-2 are now open and the relay cannot be reenergized except upon further closing of switch LS5. Upon completion of the cycle, the sequence will begin anew with the energization of control relay CR1 by the timer TM1.

From the foregoing description, those skilled in the art will appreciate that the improved apparatus of the present invention for delivering liquid samples under conditions wherein metered or measured amounts are delivered to analyzing equipment is suitable for use with a wide range of testing devices, not being limited solely to use with a chromatograph. The conditions under which the samples are delivered prevent contamination of the samples actually analyzed, minimum personal operator supervision is required and the apparatus has capacity for delivering a large number of samples before replenishment of sample vials need be undertaken.

It will thus be seen that the objects set forth above, among those made apparent from the preceding description, are efficiently attained and since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:
1. An apparatus for delivering metered quantities of liquid samples from a plurality of vials each of which has a sealed top opening to the injection port of a gas chromatograph column which includes
a turntable rotatable about a vertical axis and having means for supporting the vials along a circle of spaced locations thereon,
means for indexing said turntable in stepwise movements to successively station each of said vials in a sampling position beneath a sampling probe,
a sampling probe supported a distance above said turntable and comprising first and second tubular needles arranged parallel with said vertical axis and each having a sharp tip end, with the tip end of said second needle being located closer to said turntable than the tip end of said first needle,
stroking means operable upon the stationing of each vial in said sampling position for extending said sampling probe downwardly to move said needles into said vial through the sealed top opening thereof, and locate the tip end of said second needle below the sample liquid level and the tip end of said first needle above the sample liquid level,
a source of pressurized gas,
a first conduit connecting said source of pressurized gas with said first needle for delivering pressurized gas through said first needle into said vial,
a second conduit connected with said second needle for receiving liquid sample displaced from said vial by said pressurized gas,
a third conduit connected with the injection port of the gas chromatograph column, and
a metering valve, said second conduit being connected with a first inlet passage to said valve, said valve having a first outlet passage connected with a purging line, said third conduit being connected with a second outlet passage of said valve, said valve having a two position slider member with a constant volume passage therein, said constant volume passage establishing fluid communication between said first inlet passage and said, first outlet passage when said slider member is in a first operative position, said valve having a second inlet passage, a source of carrier gas, and a fourth conduit interconnecting said second inlet passage with said source of carrier gas, said constant volume passage establishing fluid communication between said second inlet passage and said second outlet passage when said slider member is moved to its second operative position, said slider member having an additional passage therein for maintaining communication between said valve first inlet and outlet passages when said slider member is in said second operative position,
said stroking means being operable further to retract said sampling probe during the time the turntable indexing means is operable.

References Cited
UNITED STATES PATENTS

| | | | |
|---|---|---|---|
| 3,100,948 | 8/1963 | Martin | 73—422 |
| 3,178,266 | 4/1963 | Anthon | 23—253 |
| 3,251,229 | 5/1966 | Isreeli et al. | 73—423 |
| 3,193,359 | 7/1965 | Baruch et al. | 23—253 |
| 2,693,705 | 11/1954 | Castler et al. | |

S. CLEMENT SWISHER, Primary Examiner

U.S. Cl. X.R.
73—423